(12) United States Patent
Nishimura et al.

(10) Patent No.: US 11,778,721 B2
(45) Date of Patent: Oct. 3, 2023

(54) EXTREME ULTRAVIOLET LIGHT GENERATION SYSTEM AND ELECTRONIC DEVICE MANUFACTURING METHOD

(71) Applicant: Gigaphoton Inc., Tochigi (JP)

(72) Inventors: Yuichi Nishimura, Oyama (JP); Takayuki Yabu, Oyama (JP); Hiroaki Nakarai, Oyama (JP)

(73) Assignee: Gigaphoton Inc., Tochigi (JP)

( * ) Notice: Subject to any disclaimer, the term of this patent is extended or adjusted under 35 U.S.C. 154(b) by 41 days.

(21) Appl. No.: 17/457,342

(22) Filed: Dec. 2, 2021

(65) Prior Publication Data

US 2022/0232690 A1 Jul. 21, 2022

(30) Foreign Application Priority Data

Jan. 20, 2021 (JP) .................... 2021-007564

(51) Int. Cl.
*H05G 2/00* (2006.01)
*H01S 3/16* (2006.01)
*H01S 3/13* (2006.01)
*H01S 3/11* (2023.01)

(52) U.S. Cl.
CPC ............... *H05G 2/008* (2013.01); *H01S 3/11* (2013.01); *H01S 3/1305* (2013.01); *H01S 3/1643* (2013.01)

(58) Field of Classification Search
CPC ........ H01S 3/11; H01S 3/1305; H01S 3/1643; H01S 3/0085; H01S 3/2308; H05G 2/008
See application file for complete search history.

(56) References Cited

U.S. PATENT DOCUMENTS

2013/0099140 A1\* 4/2013 Nakarai ............... H01S 3/1305
250/493.1
2014/0353528 A1 12/2014 Hayashi et al.

\* cited by examiner

*Primary Examiner* — David E Smith
*Assistant Examiner* — Hsien C Tsai
(74) *Attorney, Agent, or Firm* — Studebaker & Brackett PC

(57) ABSTRACT

An extreme ultraviolet light generation system includes a target supply unit configured to supply a target substance to a first predetermined region, a laser system configured to output pulse laser light to be radiated to the target substance in the first predetermined region, a first sensor configured to detect an arrival timing at which the target substance has reached a second predetermined region between the target supply unit and the first predetermined region, an optical adjuster arranged on an optical path of the pulse laser light between the laser system and the first predetermined region, and a processor configured to control transmittance of the pulse laser light through the optical adjuster based on the arrival timing.

20 Claims, 11 Drawing Sheets

EXTREME ULTRAVIOLET LIGHT GENERATION SYSTEM AND ELECTRONIC DEVICE MANUFACTURING METHOD

CROSS-REFERENCE TO RELATED APPLICATIONS

The present application claims the benefit of Japanese Patent Application No. 2021-007564, filed on Jan. 20, 2021, the entire contents of which are hereby incorporated by reference.

BACKGROUND

1. Technical Field

The present disclosure relates to an extreme ultraviolet light generation system and an electronic device manufacturing method.

2. Related Art

Recently, miniaturization of a transfer pattern in optical lithography of a semiconductor process has been rapidly proceeding along with miniaturization of the semiconductor process. In the next generation, fine processing at 70 to 45 nm and further at 32 nm or less will be required. Therefore, in order to meet the demand for fine processing of, for example, 32 nm or less, the development of an exposure apparatus that combines an extreme ultraviolet (EUV) light generation apparatus that generates EUV light having a wavelength of about 13 nm and reduced projection reflection optics is expected.

As an EUV light generation apparatus, three types of apparatuses have been proposed: a laser produced plasma (LPP) type apparatus using plasma generated by irradiating a target substance with pulse laser light, a discharge produced plasma (DPP) type apparatus using plasma generated by discharge, and a synchrotron radiation (SR) type apparatus using synchrotron radiation.

LIST OF DOCUMENTS

Patent Documents

Patent Document 1: US Patent Application Publication No. 2013/099140
Patent Document 2: US Patent Application Publication No. 2014/353528

SUMMARY

An extreme ultraviolet light generation system according to an aspect of the present disclosure includes a target supply unit configured to supply a target substance to a first predetermined region, a laser system configured to output pulse laser light to be radiated to the target substance in the first predetermined region, a first sensor configured to detect an arrival timing at which the target substance has reached a second predetermined region between the target supply unit and the first predetermined region, an optical adjuster arranged on an optical path of the pulse laser light between the laser system and the first predetermined region, and a processor configured to control transmittance of the pulse laser light through the optical adjuster based on the arrival timing.

An electronic device manufacturing method according to an aspect of the present disclosure includes generating extreme ultraviolet laser light in an extreme ultraviolet light generation system, emitting the extreme ultraviolet light to an exposure apparatus, and exposing a photosensitive substrate to the extreme ultraviolet light in the exposure apparatus to manufacture an electronic device. Here, the extreme ultraviolet light generation system includes a target supply unit configured to supply a target substance to a first predetermined region, a laser system configured to output pulse laser light to be radiated to the target substance in the first predetermined region, a first sensor configured to detect an arrival timing at which the target substance has reached a second predetermined region between the target supply unit and the first predetermined region, an optical adjuster arranged on an optical path of the pulse laser light between the laser system and the first predetermined region, and a processor configured to control transmittance of the pulse laser light through the optical adjuster based on the arrival timing.

An electronic device manufacturing method according to an aspect of the present disclosure includes inspecting a defect of a mask by irradiating the mask with extreme ultraviolet light generated in an extreme ultraviolet light generation system, selecting a mask using a result of the inspection, and exposing and transferring a pattern formed on the selected mask onto a photosensitive substrate. Here, the extreme ultraviolet light generation system includes a target supply unit configured to supply a target substance to a first predetermined region, a laser system configured to output pulse laser light to be radiated to the target substance in the first predetermined region, a first sensor configured to detect an arrival timing at which the target substance has reached a second predetermined region between the target supply unit and the first predetermined region, an optical adjuster arranged on an optical path of the pulse laser light between the laser system and the first predetermined region, and a processor configured to control transmittance of the pulse laser light through the optical adjuster based on the arrival timing.

BRIEF DESCRIPTION OF THE DRAWINGS

Embodiments of the present disclosure will be described below merely as examples with reference to the accompanying drawings.

DESCRIPTION OF EMBODIMENTS

Figure 1:
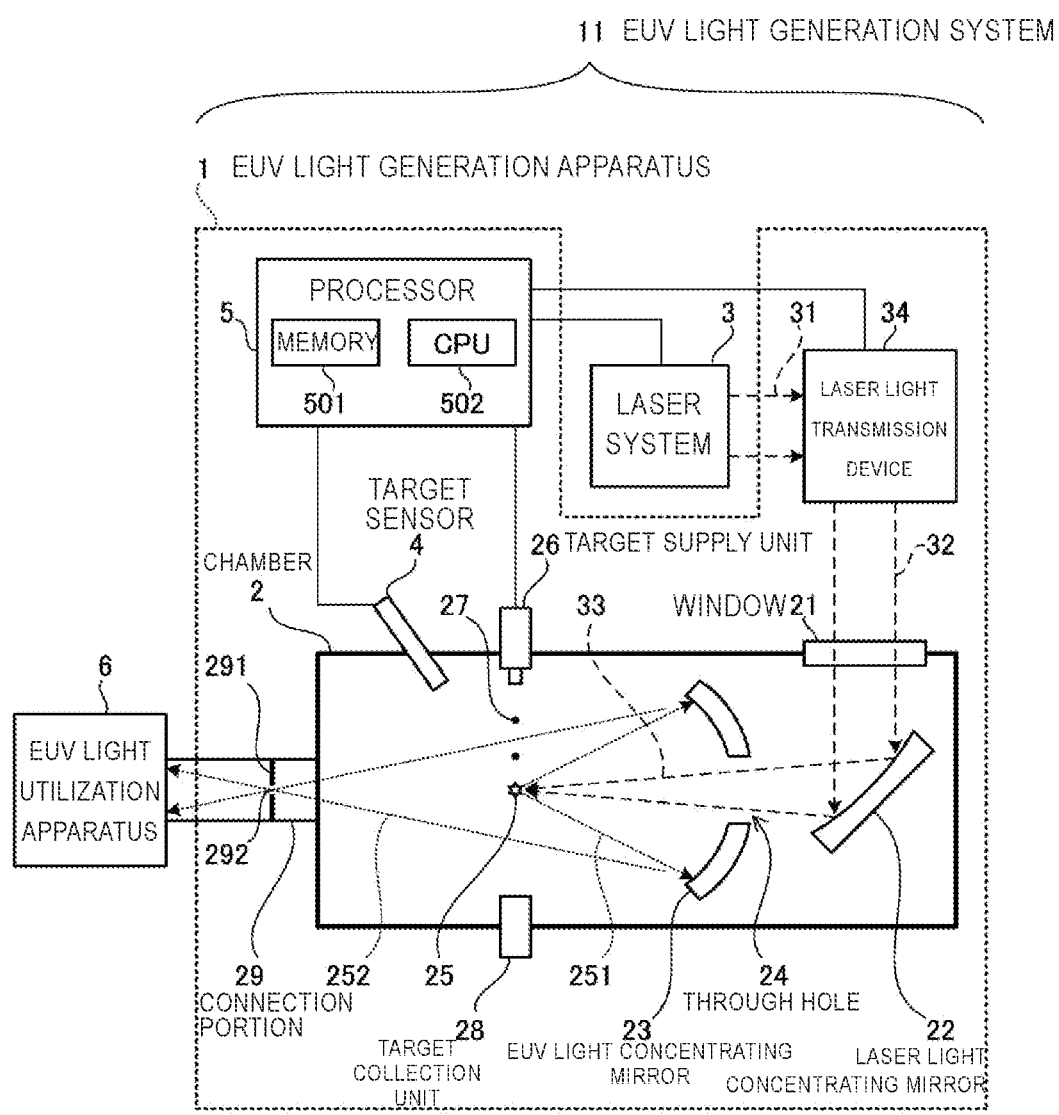
FIG. 1 schematically shows an exemplary configuration of an LPP EUV light generation system.

<Contents>
1. Overall description of EUV light generation system 11
   1.1 Configuration
   1.2 Operation
2. Comparative example
   2.1 Configuration
   2.2 Operation
   2.3 Problems of comparative example
3. EUV light generation system 11b which controls transmittance of pulse laser light 31 through optical modulator OM based on target detection signal
   3.1 Configuration and operation
   3.2 Example of function
      3.2.1 First example
      3.2.2 Second example
   3.3 Effect
4. EUV light generation system 11c including prepulse laser device 3P
   4.1 Configuration
   4.2 Operation
   4.3 Effect
5. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Overall Description of EUV Light Generation System 11

1.1 Configuration

FIG. 1 schematically shows an exemplary configuration of an LPP EUV light generation system 11. An EUV light generation apparatus 1 is used together with a laser system 3. In the present disclosure, a system including the EUV light generation apparatus 1 and the laser system 3 is referred to as the EUV light generation system 11. The EUV light generation apparatus 1 includes a chamber 2 and a target supply unit 26. The chamber 2 is a sealable container. The target supply unit 26 supplies a target 27 containing a target substance into the chamber 2. The material of the target substance may include tin, terbium, gadolinium, lithium, xenon, or a combination of any two or more thereof.

A through hole is formed in a wall of the chamber 2. The through hole is blocked by a window 21 through which pulse laser light 32 emitted from the laser system 3 passes. An EUV light concentrating mirror 23 having a spheroidal reflection surface is arranged in the chamber 2. The EUV light concentrating mirror 23 has first and second focal points. A multilayer reflection film in which molybdenum and silicon are alternately stacked is formed on a surface of the EUV light concentrating mirror 23. The EUV light concentrating mirror 23 is arranged such that the first focal point is located in a plasma generation region 25 and the second focal point is located at an intermediate focal point 292. The plasma generation region 25 corresponds to the first predetermined region in the present disclosure. A through hole 24 is formed at the center of the EUV light concentrating mirror 23, and pulse laser light 33 passes through the through hole 24.

The EUV light generation apparatus 1 includes a processor 5, a target sensor 4, and the like. The processor 5 is a processing device including a memory 501 in which a control program is stored, and a central processing unit (CPU) 502 which executes the control program. The processor 5 is specifically configured or programmed to perform various processes included in the present disclosure. The target sensor 4 detects at least one of the presence, trajectory, position, and velocity of the target 27. The target sensor 4 may have an imaging function.

Further, the EUV light generation apparatus 1 includes a connection portion 29 providing communication between the internal space of the chamber 2 and the internal space of an EUV light utilization apparatus 6. An example of the EUV light utilization apparatus 6 will be described later with reference to FIGS. 12 and 13. A wall 291 in which an aperture is formed is arranged in the connection portion 29. The wall 291 is arranged such that the aperture is located at the second focal point of the EUV light concentrating mirror 23.

Furthermore, the EUV light generation apparatus 1 includes a laser light transmission device 34, a laser light concentrating mirror 22, a target collection unit 28 for collecting the target 27, and the like. The laser light transmission device 34 includes an optical element for defining a transmission state of laser light, and an actuator for adjusting the position, posture, and the like of the optical element.

1.2 Operation

Operation of the EUV light generation system 11 will be described with reference to FIG. 1. Pulse laser light 31 emitted from the laser system 3 enters, via the laser light transmission device 34, the chamber 2 through the window 21 as the pulse laser light 32. The pulse laser light 32 travels along a laser light path in the chamber 2, is reflected by the laser light concentrating mirror 22, and is radiated to the target 27 as the pulse laser light 33.

The target supply unit 26 outputs the target 27 toward the plasma generation region 25 in the chamber 2. The target 27 is irradiated with the pulse laser light 33. The target 27 irradiated with the pulse laser light 33 is turned into plasma, and radiation light 251 is radiated from the plasma. EUV light contained in the radiation light 251 is reflected by the EUV light concentrating mirror 23 with higher reflectance than light in other wavelength ranges. Reflection light 252 including the EUV light reflected by the EUV light concentrating mirror 23 is concentrated at the intermediate focal point 292 and output to the EUV light utilization apparatus 6. Here, one target 27 may be irradiated with a plurality of pulses included in the pulse laser light 33.

The processor 5 controls the entire EUV light generation system 11. The processor 5 processes a detection result of the target sensor 4. Based on the detection result of the target sensor 4, the processor 5 controls the timing at which the target 27 is output, the output direction of the target 27, and the like. Furthermore, the processor 5 controls the oscillation timing of the laser system 3, the travel direction of the pulse laser light 32, the concentrating position of the pulse laser light 33, and the like. The above-described various kinds of control are merely examples, and other control may be added as necessary.

2. Comparative Example

2.1 Configuration

Figure 2:
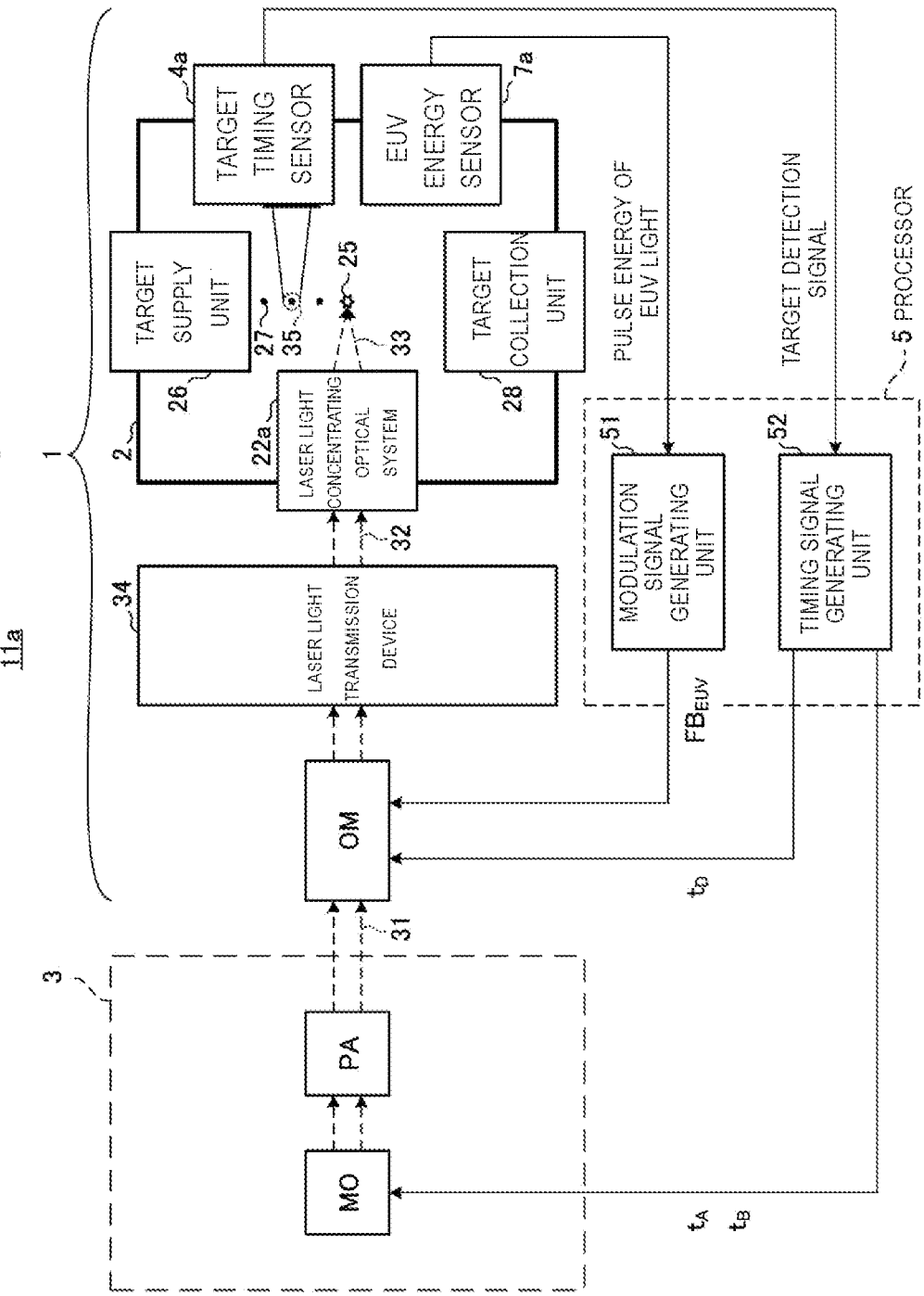
FIG. 2 schematically shows the configuration of an EUV light generation system according to a comparative example.

FIG. 2 schematically shows the configuration of an EUV light generation system 11a according to a comparative example. The comparative example of the present disclosure is an example recognized by the applicant as known only by the applicant, and is not a publicly known example admitted by the applicant.

In the EUV light generation system 11a according to the comparative example, the laser system 3 includes a master oscillator MO and an amplifier PA. At least one of the master oscillator MO and the amplifier PA is an yttrium aluminum garnet (YAG) laser device including, as a laser medium, a YAG crystal or a YAG crystal doped with impurities such as neodymium. Alternatively, the laser system 3 may be a laser device including, as the laser medium, an $Nd:YVO_4$ crystal or an optical fiber doped with a rare earth such as Yb. The YAG laser device, the $Nd:YVO_4$ laser device, or the fiber laser device further includes an excitation light source such as a laser diode (not shown). The excitation light source excites the laser medium by outputting continuous oscillation laser light.

An optical modulator OM is arranged on an optical path of the pulse laser light 31 between the laser system 3 and the plasma generation region 25. The optical modulator OM is an example of the optical adjuster in the present disclosure. The optical modulator OM includes an acoustic optical element (not shown) and transmittance of the pulse laser light 31 is controlled by an application voltage applied to the acoustic optical element. The optical modulator OM may include an electric optical element or an attenuator instead of the acoustic optical element, and the transmittance of the pulse laser light 31 may be controlled by the application voltage to the electric optical element or the attenuator. In the present disclosure, the application voltage applied to the acoustic optical element, the electric optical element, or the attenuator is referred to as the application voltage of the optical modulator OM.

A target timing sensor 4a, an EUV energy sensor 7a, and a laser light concentrating optical system 22a are arranged in the chamber 2. The target timing sensor 4a corresponds to the first sensor in the present disclosure, and the EUV energy sensor 7a corresponds to the second sensor in the present disclosure. The target timing sensor 4a includes a light source, a transfer optical system, and an optical sensor which are not illustrated. The light source illuminates the target 27 having reached a detection region 35 between the target supply unit 26 and the plasma generation region 25. The detection region 35 corresponds to the second predetermined region in the present disclosure. The transfer optical system images a part of an image of the target 27 illuminated by the light source on the optical sensor. The optical sensor detects a change in light intensity when the target 27 passes through the detection region 35. The optical sensor may be a line sensor or an image sensor. The EUV energy sensor 7a is arranged at a position where a part of the EUV light generated in the plasma generation region 25 is incident. The processor 5 includes a modulation signal generating unit 51 and a timing signal generating unit 52.

2.2 Operation

The master oscillator MO performs laser oscillation and outputs pulse laser light. The output timing of the pulse laser light from the master oscillator MO is defined by a trigger timing signal output from the timing signal generating unit 52 to the master oscillator MO. The amplifier PA amplifies the pulse laser light incident from the master oscillator MO. Thus, the laser system 3 outputs the pulse laser light 31.

The optical modulator OM transmits the pulse laser light 31 at the transmittance corresponding to the application voltage. The application voltage of the optical modulator OM is defined by a modulation signal output from the modulation signal generating unit 51 to the optical modulator OM. The timing for changing the application voltage of the optical modulator OM is defined by a modulation timing signal output from the timing signal generating unit 52 to the optical modulator OM.

The laser light transmission device 34 guides the pulse laser light 31 incident from the optical modulator OM to the laser light concentrating optical system 22a as the pulse laser light 32. The laser light concentrating optical system 22a concentrates the pulse laser light 32 incident from the laser light transmission device 34 to the plasma generation region 25 as the pulse laser light 33.

The target supply unit 26 supplies the target 27 in a droplet form to the plasma generation region 25 by outputting the target 27 toward the plasma generation region 25. The target timing sensor 4a detects the arrival timing at which the target 27 has reached the detection region 35, and outputs a target detection signal indicating the arrival timing to the timing signal generating unit 52. The pulse laser light 33 is radiated to the target 27 in the plasma generation region 25. The EUV energy sensor 7a detects pulse energy of the EUV light generated by irradiating the target 27 with the pulse laser light 33, and outputs the detection result to the modulation signal generating unit 51. The pulse energy of the EUV light corresponds to the second pulse energy in the present disclosure.

The modulation signal generating unit 51 outputs a modulation signal for controlling the application voltage of the optical modulator OM based on the pulse energy of the EUV light received from the EUV energy sensor 7a. The modulation signal includes a feedback control signal $FB_{EUV}$ based on the pulse energy of the EUV light. For example, when the pulse energy of the EUV light is lower than a target value, the transmittance of the pulse laser light 31 through the optical modulator OM may be increased by increasing the application voltage of the optical modulator OM. Since the pulse energy of the target 27 radiated with the pulse laser light 33 is increased by increasing the transmittance of the pulse laser light 31, higher energy is applied to the target 27. Accordingly, the pulse energy of the EUV light is increased and is allowed to approach the target value.

Based on the target detection signal received from the target timing sensor 4a, the timing signal generating unit 52 outputs the trigger timing signal to the master oscillator MO and outputs the modulation timing signal to the optical modulator OM. In the present disclosure, the trigger timing signal and the modulation timing signal may be collectively referred to as a timing signal.

Figure 3:
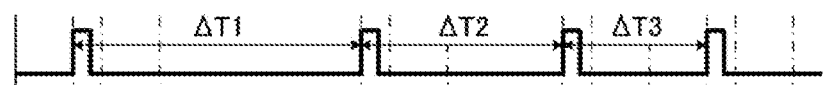
FIG. 3 is a timing chart of laser control in the comparative example.
Figure 3:
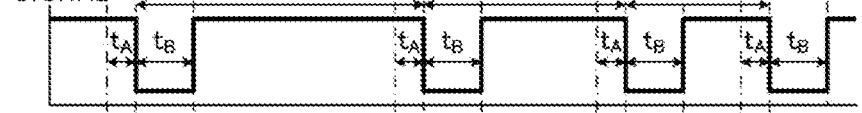
Figure 3:
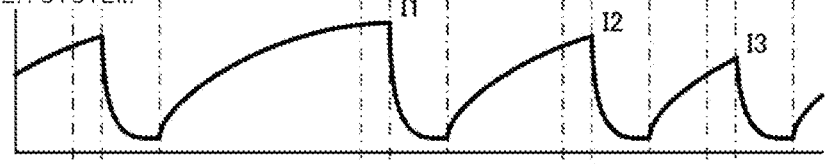
Figure 3:
Figure 3:
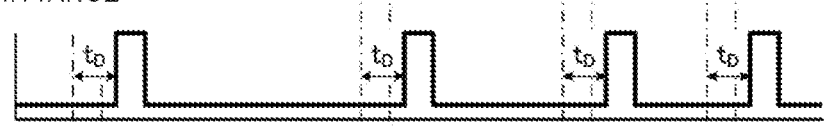
Figure 3:
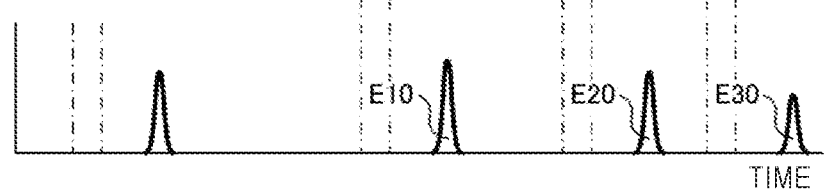

FIG. 3 is a timing chart of laser control in a comparative example. The target detection signal output from the target timing sensor 4a to the timing signal generating unit 52 includes a plurality of pulses. For example, the rising timing of each pulse indicates the arrival timing at which the target 27 has reached the detection region 35. Time intervals ΔT1, ΔT2, ΔT3, . . . from the rising of one pulse to the rising of the next pulse correspond to the time intervals of the targets 27.

The trigger timing signal output from the timing signal generating unit 52 to the master oscillator MO includes a first trigger having a delay time $t_A$ with respect to the rising of a pulse in the target detection signal. Since the delay time $t_A$ is constant, the time intervals ΔT1, ΔT2, ΔT3, . . . of the first trigger are equal to the time intervals ΔT1, ΔT2, ΔT3, . . . of the targets 27, respectively. Since the master oscillator MO starts laser oscillation at the timing of receiving the first trigger, a laser oscillation interval ΔTn is equal to each of the time intervals ΔT1, ΔT2, ΔT3, . . . of the first trigger. The delay time $t_A$ corresponds to the difference between the time required for the target 27 to reach the plasma generation region 25 after reaching the detection region 35 and the time required for the pulse laser light 33 to reach the plasma generation region 25 after the master oscillator MO starts laser oscillation.

The trigger timing signal may further include a second trigger having a delay time $t_A+t_B$ with respect to the rising of a pulse in the target detection signal. The laser system 3 starts excitation of the laser medium for the next laser oscillation at the timing of receiving the second trigger. The excitation energy of the laser medium is accumulated until the master oscillator MO receives the first trigger for the next laser oscillation.

The delay time $t_A$ may be defined by the timing of the falling of the trigger timing signal and the delay time $t_A+t_B$ may be defined by the timing of the rising of the trigger timing signal.

The modulation timing signal output from the timing signal generating unit 52 to the optical modulator OM includes a third trigger having a delay time $t_D$ with respect to the rising of a pulse in the target detection signal. The delay time $t_D$ is longer than the delay time $t_A$. The difference between the delay time $t_D$ and the delay time $t_A$ is shorter than the time required for the pulse laser light 31 to reach the optical modulator OM after the master oscillator MO starts laser oscillation.

When receiving the modulation timing signal including the third trigger from the timing signal generating unit 52, the optical modulator OM changes the transmittance of the pulse laser light 31 through the optical modulator OM by changing the application voltage in accordance with the modulation signal received from the modulation signal generating unit 51.

2.3 Problems of Comparative Example

As shown in FIG. 3, the time intervals ΔT1, ΔT2, ΔT3, . . . of the targets 27 appearing in the target detection signal may vary. Variation in the time intervals ΔT1, ΔT2, ΔT3, . . . of the targets 27 occurs due to changes in the mechanical conditions of the target supply unit 26 and the like. In FIG. 3, variation in the time intervals ΔT1, ΔT2, ΔT3, . . . of the targets 27 is depicted in an exaggerated manner.

The laser oscillation interval ΔTn also varies in accordance with variation in the time intervals ΔT1, ΔT2, ΔT3, . . . of the targets 27.

The excitation intensity I1, I2, I3, . . . of the laser system 3 may vary in accordance with the laser oscillation interval ΔTn. For example, in the laser system 3 that excites the laser medium with continuous oscillation laser light, the excitation intensity I1, I2, I3, . . . can be higher when the laser oscillation interval ΔTn is long than that when the laser oscillation interval ΔTn is short.

The laser light intensity of the pulse laser light 33 varies in accordance with the excitation intensity I1, I2, I3, . . . of the laser system 3, and the pulse energy E10, E20, E30, . . . varies in accordance with the laser light intensity. For example, when the transmittance of the pulse laser light 31 is set the same for a plurality of pulses by setting the application voltage of the optical modulator OM, the pulse energy E10, E20, E30, . . . of the pulse laser light 33 increases as the excitation intensity of the laser system 3 I1, I2, I3, . . . increases.

If the pulse energy E10, E20, E30, . . . of the pulse laser light 33 varies, the pulse energy of the EUV light may become unstable.

3. EUV Light Generation System 11b which Controls Transmittance of Pulse Laser Light 31 Through Optical Modulator OM Based on Target Detection Signal

3.1 Configuration and Operation

Figure 4:
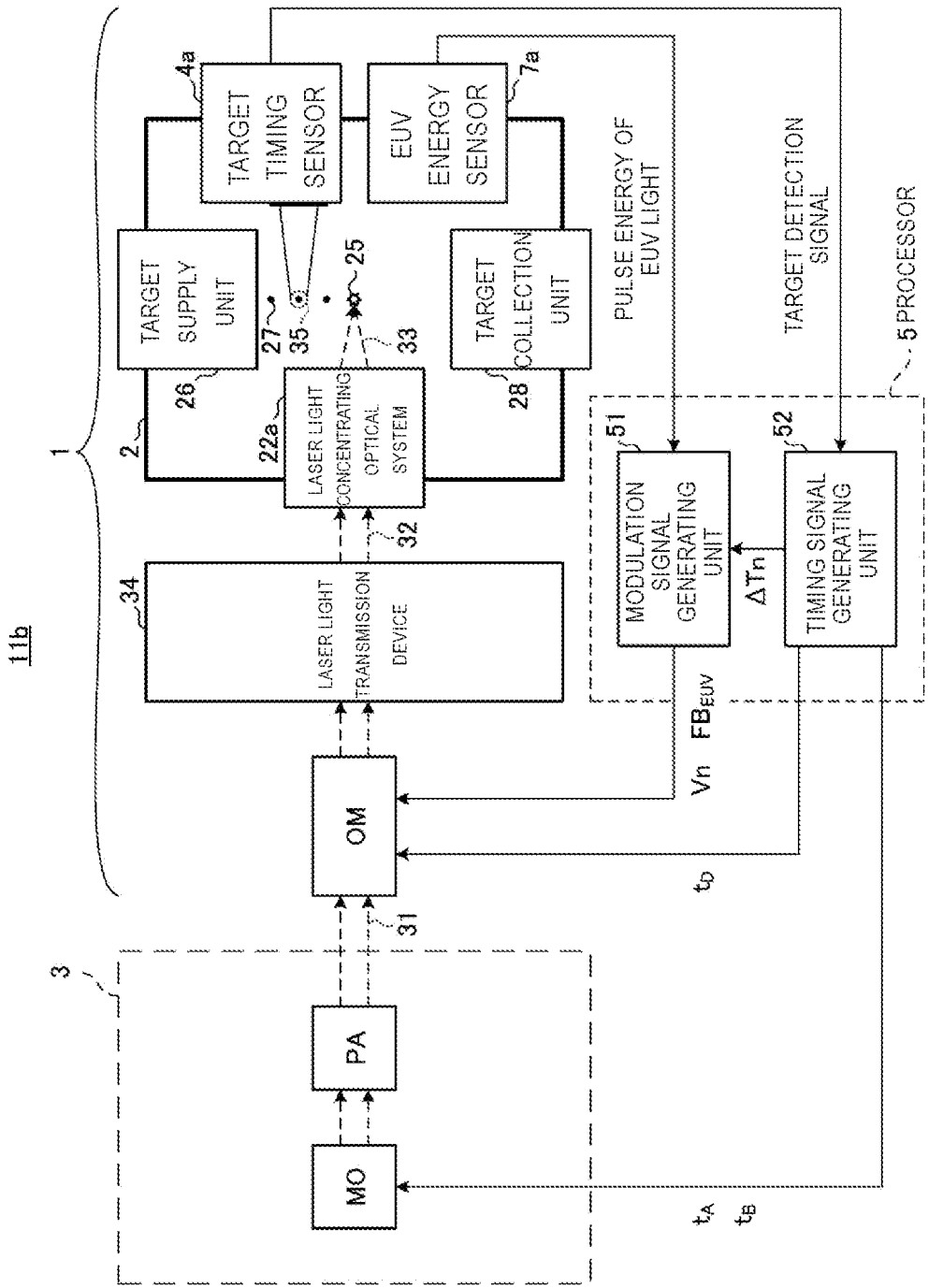
FIG. 4 schematically shows the configuration of an EUV light generation system according to a first embodiment.
Figure 5:
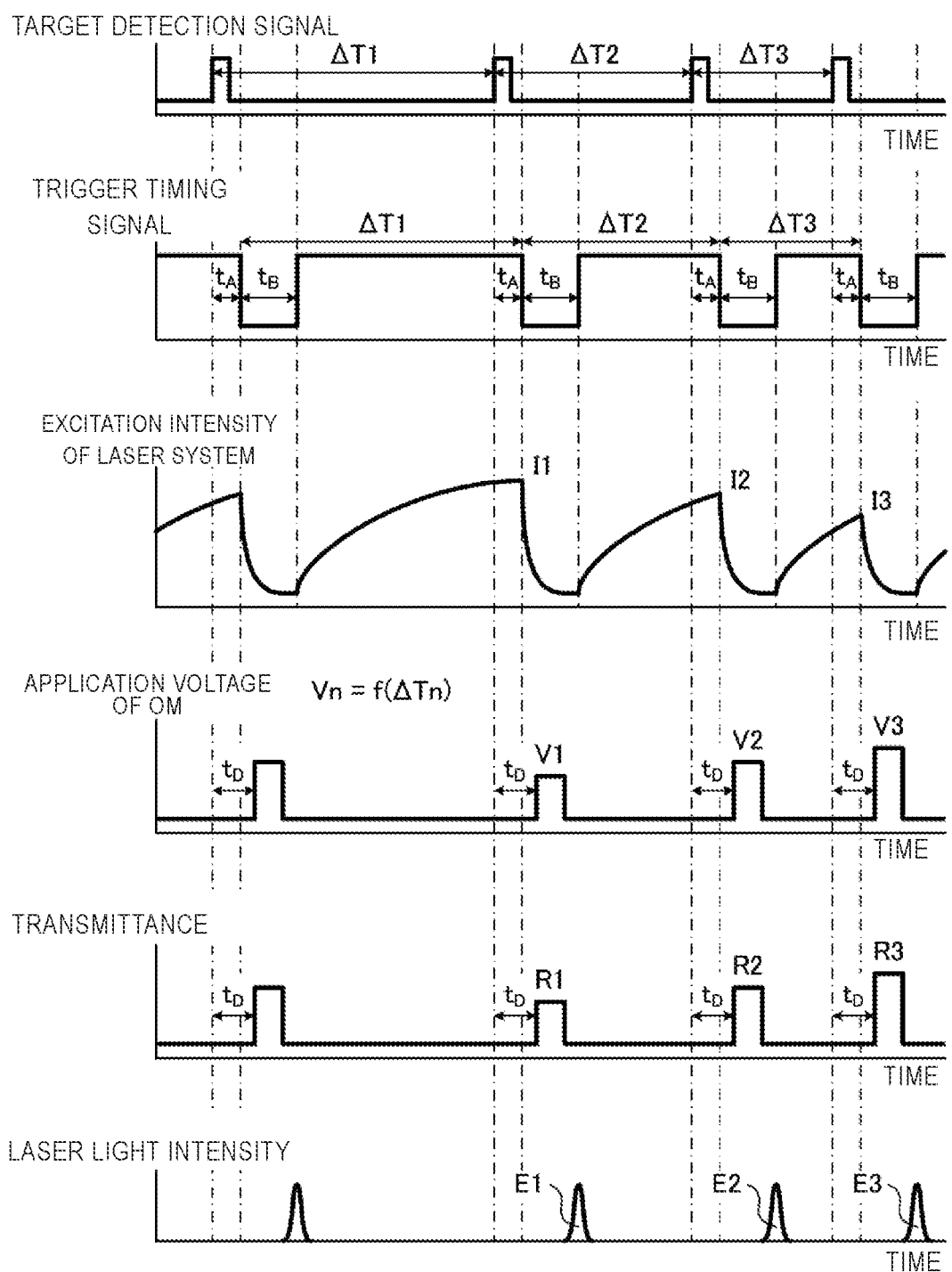
FIG. 5 is a timing chart of laser control in the first embodiment.

FIG. 4 schematically shows the configuration of an EUV light generation system 11b according to a first embodiment. FIG. 5 is a timing chart of laser control in the first embodiment.

In the first embodiment, the timing signal generating unit 52 calculates the time intervals ΔT1, ΔT2, ΔT3, . . . of the targets 27 based on the detection time difference of the target detection signal sequentially received from the target timing sensor 4a. The timing signal generating unit 52 may include a timer that measures the detection time difference. The timing signal generating unit 52 outputs the time intervals ΔT1, ΔT2, ΔT3, . . . of the targets 27 as the laser oscillation interval ΔTn to the modulation signal generating unit 51.

The target detection signal, the trigger timing signal, and the excitation intensity I1, I2, I3, . . . of the laser system 3 shown in FIG. 5 may be similar to those described in the comparative example.

The modulation signal generating unit 51 calculates the application voltages V1, V2, V3, . . . of the optical modulator OM based on the laser oscillation interval ΔTn. In the present disclosure, the application voltages V1, V2, V3, . . . of the optical modulator OM calculated based on the laser oscillation interval ΔTn may be collectively referred to as an application voltage Vn.

The modulation signal generating unit 51 controls the transmittance R1, R2, R3, . . . of the pulse laser light 31 through the optical modulator OM by controlling the application voltages V1, V2, V3, . . . of the optical modulator OM.

Thus, the processor 5 controls the transmittance R1, R2, R3, . . . of the pulse laser light 31 through the optical modulator OM based on the arrival timing detected by the target timing sensor 4a.

The application voltage Vn is given by a function of the laser oscillation interval ΔTn.

$$Vn = f(\Delta Tn)$$

Specific examples of the function will be described later with reference to FIGS. 6 to 10.

For example, when the time interval of the targets 27 is the first time interval ΔT1, the application voltage V1 is set so that the transmittance of the pulse laser light 31 through the optical modulator OM is the first transmittance R1. When the time interval of the targets 27 is the second time interval ΔT2 shorter than the first time interval ΔT1, the application voltage V2 is set so that the transmittance is the second transmittance R2 higher than the first transmittance R1.

Thus, a second variation in the pulse energy of the pulse laser light 33 transmitted through the optical modulator OM and radiated to the target 27 is smaller than a first variation in the pulse energy of the pulse laser light 31 incident on the optical modulator OM. The first variation corresponds to variation in the excitation intensity I1, I2, I3, . . . . The second variation corresponds to variation in the pulse energy E1, E2, E3, . . . shown in FIG. 5.

The processor 5 performs the following operation within a period after the target 27 reaches the detection region 35 until the target 27 reaches the plasma generation region.

1. The timing signal generating unit 52 receives the target detection signal indicating the time interval ΔT1 of the targets 27 from the target timing sensor 4a, and transmits the time interval ΔT1 of the targets 27 as the laser oscillation interval ΔTn to the modulation signal generating unit 51.

2. The timing signal generating unit 52 outputs the trigger timing signal based on the time interval ΔT1 of the targets 27 to the master oscillator MO.

3. Before the pulse laser light output from the master oscillator MO reaches the optical modulator OM in accordance with the trigger timing signal based on the time interval ΔT1 of the targets 27, the modulation signal generating unit 51 controls the transmittance R1 of the pulse laser light 31 through the optical modulator OM based on the time interval ΔT1 of the targets 27.

Thus, for each pulse, the transmittance R1 is controlled based on the time interval ΔT1 of the targets 27 within the period after the target 27 reaches the detection region 35 and until the target 27 reaches the plasma generation region 25. The same applies to another target 27 reaching the detection region 35 thereafter.

The modulation signal generating unit 51 may control the transmittance R1, R2, R3, . . . using both the application voltage Vn calculated based on the laser oscillation interval ΔTn and the feedback control signal $FB_{EUV}$ based on the pulse energy of the EUV light. In this case, the application voltage Vn calculated based on the laser oscillation interval ΔTn may be corrected based on the pulse energy of the EUV light, or the feedback control signal $FB_{EUV}$ based on the pulse energy of the EUV light may be corrected based on the laser oscillation interval ΔTn.

3.2 Example of Function

3.2.1 First Example

Figure 6:
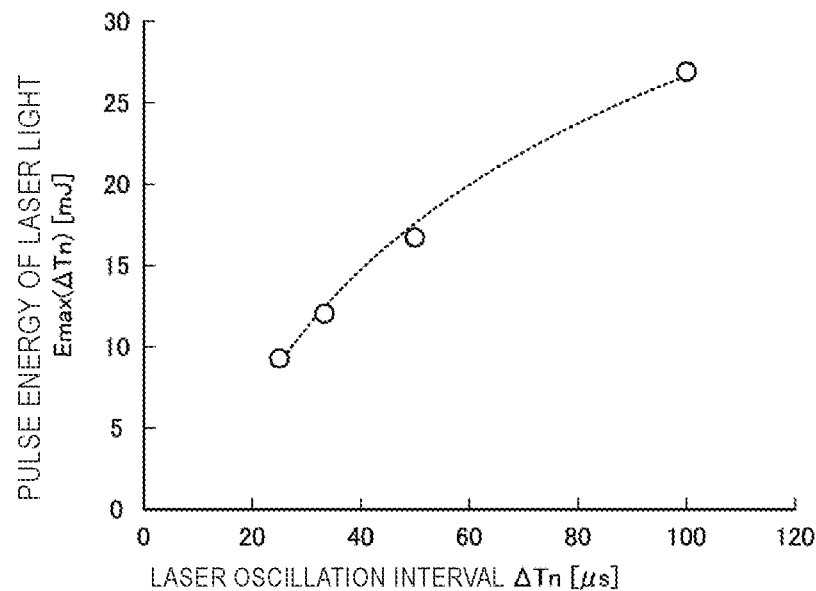
FIG. 6 is a graph showing the relationship between a laser oscillation interval $\Delta Tn$ of a laser system and pulse energy $Emax(\Delta Tn)$ of pulse laser light when transmittance of pulse laser light through an optical modulator is controlled to the maximum value.

FIG. 6 is a graph showing the relationship between the laser oscillation interval ΔTn of the laser system 3 and pulse energy Emax(ΔTn) of the pulse laser light 33 when the transmittance of the pulse laser light 31 through the optical modulator OM is controlled to the maximum value. The pulse energy Emax(ΔTn) corresponds to the first pulse energy in the present disclosure. In FIG. 6, the longer the laser oscillation interval ΔTn is, the higher the pulse energy Emax(ΔTn) is. The modulation signal generating unit 51 controls the application voltage Vn of the optical modulator OM based on the relationship between the laser oscillation interval ΔTn and the pulse energy Emax(ΔTn) shown in FIG. 6.

Figure 7:
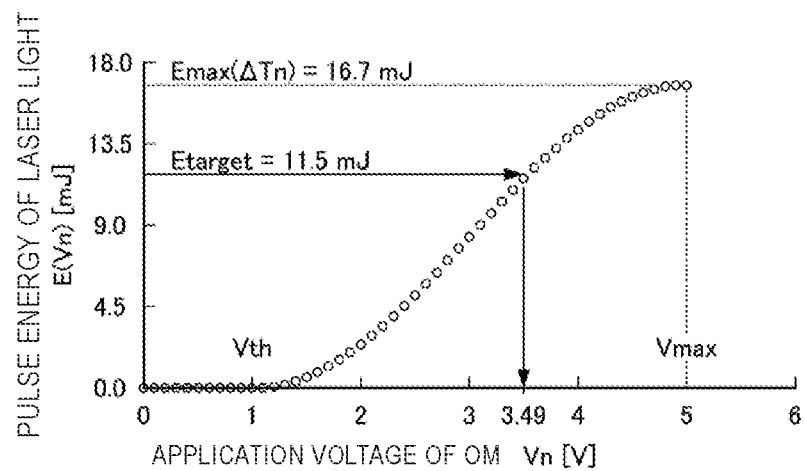
FIG. 7 is a graph showing the relationship between an application voltage $Vn$ of the optical modulator and pulse energy $E(Vn)$ of the pulse laser light.

FIG. 7 is a graph showing the relationship between the application voltage Vn of the optical modulator OM and the pulse energy E(Vn) of the pulse laser light 33. FIG. 7 is obtained from the relationship between the application voltage Vn of the optical modulator OM and the transmittance of the pulse laser light 31 through the optical modulator OM.

The pulse energy Emax(ΔTn) of the pulse laser light 33 when the transmittance of the pulse laser light 31 through the optical modulator OM is controlled to the maximum value differs in accordance with the laser oscillation interval ΔTn. The value of the pulse energy Emax(ΔTn) is determined using the relationship shown in FIG. 6.

As shown in FIG. 7, the pulse energy E(Vn) varies by changing the transmittance according to the application voltage Vn of the optical modulator OM. When the application voltage Vn is equal to or less than the threshold voltage Vth, the pulse energy E(Vn) becomes 0, and when the application voltage Vn is equal to or more than the maximum voltage Vmax, the pulse energy E(Vn) becomes Emax(ΔTn). As the application voltage Vn increases from the threshold voltage Vth to the maximum voltage Vmax, the pulse energy E(Vn) gradually increases from 0 to Emax(ΔTn). Between the threshold voltage Vth and the maximum voltage Vmax, the pulse energy E(Vn) varies in proportion to a square value of the sine of the application voltage Vn. By determining the application voltage Vn based on the properties shown in FIG. 7, it is possible to control the transmittance of the pulse laser light 31 through the optical modulator OM and to control the pulse energy E(Vn) of the pulse laser light 33.

A first example of the function for calculating the application voltage Vn based on the laser oscillation interval ΔTn is given by the following expression.

$$Vn = (2/\pi)(V\text{max} - V\text{th})\sin^{-1}[\sqrt{\{E\text{target}/E\text{max}(\Delta Tn)\}}] + V\text{th} \quad \text{(Expression 1)}$$

Here, $X = \sin^{-1}[Y]$ represents an inverse function of a sine function, and $\sqrt{\{Z\}}$ represents a positive square root of Z. Π is the circular constant. Etarget is the target value of the pulse energy E(Vn).

For example, it is assumed that the threshold voltage Vth is 1 V, the maximum voltage Vmax is 5 V, and the target value Etarget of the pulse energy E(Vn) is 11.5 mJ. Further, it is assumed that the pulse energy Emax(ΔTn) of the pulse laser light 33 when the transmittance of the pulse laser light 31 through the optical modulator OM is controlled to the maximum value is 16.7 mV. Then, the application voltage Vn is calculated to be about 3.49 V from Expression 1.

Figure 8:
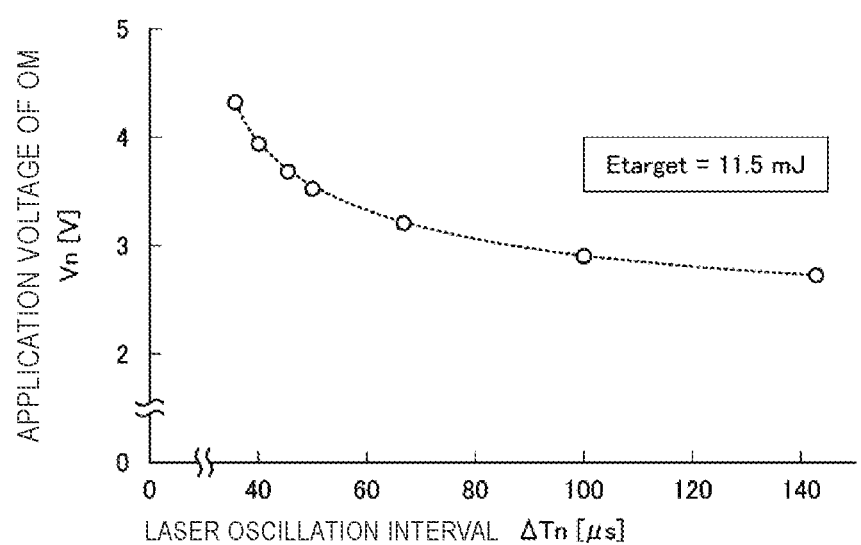
FIG. 8 is a graph showing the relationship between the laser oscillation interval $\Delta Tn$ and the application voltage $Vn$ set based thereon.

FIG. 8 is a graph showing the relationship between the laser oscillation interval ΔTn and the application voltage Vn set based thereon. FIG. 8 exemplarily shows the case where the target value Etarget of the pulse energy E(Vn) is 11.5 mJ. Even when the laser oscillation interval ΔTn varies due to variation in the time intervals ΔT1, ΔT2, ΔT3, . . . of the target 27, the pulse energy E(Vn) can be set close to the target value Etarget by controlling the application voltage Vn of the optical modulator OM.

3.2.2 Second Example

Figure 9:
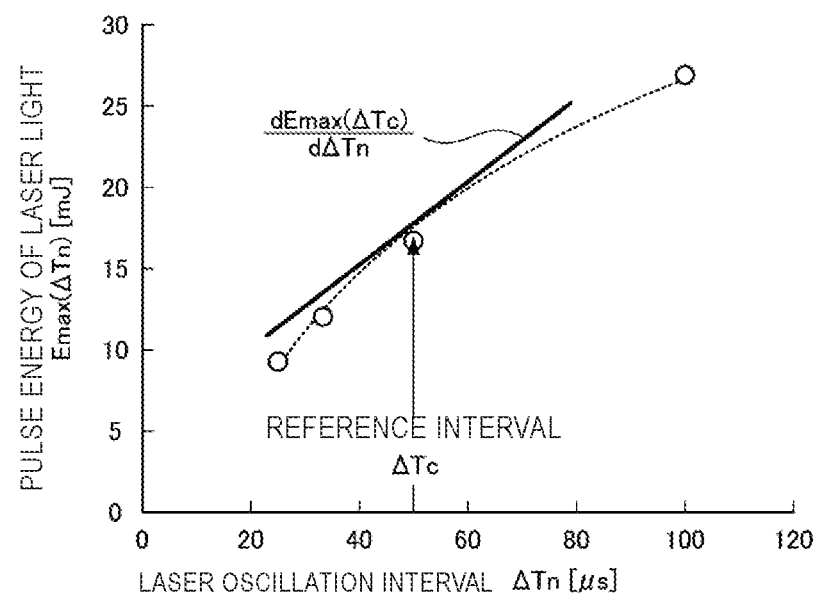
FIG. 9 is a graph showing the relationship between the laser oscillation interval $\Delta Tn$ of the laser system and the pulse energy $Emax(\Delta Tn)$ of the pulse laser light when the transmittance of the pulse laser light through the optical modulator is controlled to the maximum value.

FIG. 9 is a graph showing the relationship between the laser oscillation interval ΔTn of the laser system 3 and the pulse energy Emax(ΔTn) of the pulse laser light 33 when the transmittance of the pulse laser light 31 through the optical modulator OM is controlled to the maximum value. FIG. 9 shows the differential coefficient dEmax(ΔTc)/dΔTn (i.e., the gradient) of the pulse energy Emax(ΔTn) at a reference interval ΔTc in the same graph as FIG. 6.

Here, it is assumed that the laser oscillation interval ΔTn of the laser system 3 varies in the vicinity of the reference interval ΔTc, and that the change rate of the pulse energy Emax(ΔTn) at that time is approximated by the differential coefficient dEmax(ΔTc)/dΔTn. This is the first assumption.

Figure 10:
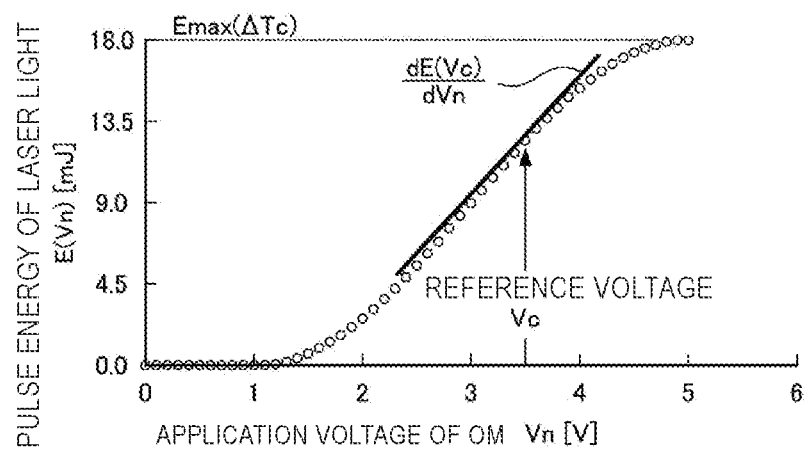
FIG. 10 is a graph showing the relationship between the application voltage $Vn$ of the optical modulator and the pulse energy $E(Vn)$ of the pulse laser light.

FIG. 10 is a graph showing the relationship between the application voltage Vn of the optical modulator OM and the pulse energy E(Vn) of the pulse laser light 33. In FIG. 10, the laser oscillation interval ΔTn is the reference interval ΔTc shown in FIG. 9. That is, the pulse energy of the pulse laser light 33 when the transmittance of the pulse laser light 31 through the optical modulator OM is controlled to the maximum value is Emax(ΔTc). FIG. 10 further shows the differential coefficient dE(Vc)/dVn (i.e., the gradient) of the pulse energy E(Vn) at a reference voltage Vc.

Here, it is assumed that the application voltage Vn of the optical modulator OM is controlled to vary in the vicinity of the reference voltage Vc, and that the change rate of the pulse energy E(Vn) at that time is approximated by the differential coefficient dE(Vc)/dVn. This is the second assumption.

To the extent that both the first and second assumptions hold, a second example of the function for calculating the application voltage Vn based on the laser oscillation interval ΔTn is given by the following expression.

$$Vn = (dEmax(\Delta Tc)/d\Delta Tn)(dVn/dE(Vc))(\Delta Tc - \Delta Tn) + Vc$$

Here, dVn/dE(Vc) is the inverse of the differential coefficient dE(Vc)/dVn shown in FIG. 10.

Here, the reference voltage Vc is given by the following expression using the reference interval ΔTc and the target value Etarget of the pulse energy E(Vn).

$$Vc = (2/\pi)(Vmax - Vth)\sin^{-1}[\sqrt{\{Etarget/Emax(\Delta Tc)\}}] + Vth$$

3.3 Effect (1) According to the first embodiment, the EUV light generation system 11b includes the target supply unit 26 which supplies the target 27 to the plasma generation region 25, and the laser system 3 which outputs the pulse laser light 31 to 33 to be radiated to the target 27 in the plasma generation region 25. The EUV light generation system 11b further includes the target timing sensor 4a which detects the arrival timing at which the target 27 has reached the detection region 35 between the target supply unit 26 and the plasma generation region 25, and the optical modulator OM arranged on the optical path of the pulse laser light 31 between the laser system 3 and the plasma generation region 25. The EUV light generation system 11b further includes the processor 5 which controls the transmittance of the pulse laser light 31 through the optical modulator OM based on the arrival timing.

Accordingly, even when the time intervals ΔT1, ΔT2, ΔT3, . . . of the targets 27 vary, it is possible to suppress variation in the pulse energy of the pulse laser light 33 radiated to the target 27. Therefore, it is possible to stabilize the pulse energy of the EUV light.

(2) According to the first embodiment, when the arrival timing detected by the target timing sensor 4a is the first time interval ΔT1, the optical modulator OM transmits the pulse laser light 31 at the first transmittance R1. Further, when the arrival timing detected by the target timing sensor 4a is the second time interval ΔT2 shorter than the first time interval ΔT1, the optical modulator OM transmits the pulse laser light 31 at the second transmittance R2 higher than the first transmittance R1.

Accordingly, even when the time intervals ΔT1, ΔT2 of the targets 27 are short, it is possible to suppress decrease of the pulse energy of the pulse laser light 33 radiated to the target 27.

(3) According to the first embodiment, the transmittance of the pulse laser light 31 through the optical modulator OM is controlled so that the second variation in the pulse energy of the pulse laser light 33 transmitted through the optical modulator OM and radiated to the target 27 is smaller than the first variation in the pulse energy of the pulse laser light 31 incident on the optical modulator OM.

Accordingly, even when the pulse energy of the pulse laser light 31 output from the laser system 3 varies, it is possible to suppress variation in the pulse energy of the pulse laser light 33 radiated to the target 27.

(4) According to the first embodiment, the processor 5 controls the transmittance of the pulse laser light 31 through the optical modulator OM by controlling the application voltage Vn of the optical modulator OM.

Accordingly, the transmittance of the pulse laser light 31 can be controlled with high response performance.

(5) According to the first embodiment, the processor 5 controls the transmittance of the pulse laser light 31 through the optical modulator OM based on the arrival timing of the target 27 to the detection region 35 within the period after the target 27 reaches the detection region 35 until the target 27 reaches the plasma generation region.

At the timing when the target 27 reaches the plasma generation region 25, the pulse laser light 33 reaches the plasma generation region 25. Therefore, by controlling the transmittance before the target 27 reaches the plasma generation region 25, the target 27 can be irradiated with the pulse laser light 33 having the pulse energy adjusted.

(6) According to the first embodiment, the processor 5 outputs the trigger timing signal to the laser system 3 based on the arrival timing at which the target 27 has reached the detection region 35.

Accordingly, the laser system 3 can perform laser oscillation at an appropriate timing for irradiating the target 27 with the pulse laser light 33.

(7) According to the first embodiment, the processor 5 outputs different timing signals respectively to the laser system 3 and the optical modulator OM based on the arrival timing at which the target 27 has reached the detection region 35.

Accordingly, the timing of the laser oscillation of the laser system 3 and the timing for changing the transmittance through the optical modulator OM can be controlled separately.

(8) According to the first embodiment, the transmittance is controlled based on the relationship between the laser oscillation interval ΔTn of the laser system 3 and the pulse energy Emax(ΔTn) of the pulse laser light 33 when the transmittance of the pulse laser light 31 through the optical modulator OM is controlled to the maximum value.

Accordingly, even when the time intervals ΔT1, ΔT2, ΔT3, . . . of the targets 27 vary, it is possible to suppress variation in the pulse energy of the pulse laser light 33 due to variation in the laser oscillation interval ΔTn.

(9) According to the first embodiment, the transmittance is controlled based on both of the relationship between the laser oscillation interval $\Delta Tn$ and the pulse energy Emax($\Delta Tn$) and the relationship between the application voltage Vn of and the transmittance through the optical modulator OM.

Accordingly, the transmittance of the pulse laser light 31 through the optical modulator OM can be controlled in accordance with variation in the pulse energy of the pulse laser light 31 due to variation in the laser oscillation interval $\Delta Tn$, so that the pulse energy of the pulse laser light 33 is stabilized.

(10) According to the first embodiment, the transmittance is controlled based on both of the change rate of the pulse energy Emax($\Delta Tn$) when the laser oscillation interval $\Delta Tn$ of the laser system 3 varies and the change rate of the transmittance when the application voltage Vn of the optical modulator OM varies.

Accordingly, even without performing complex calculations such as an inverse function of a sine function for each pulse, it is possible to perform control using the change rate calculated in advance, and thus the load of the processor 5 for each pulse can be reduced.

(11) According to the first embodiment, the target supply unit 26 supplies the target 27 in a droplet form to the plasma generation region 25.

Accordingly, it is possible to reduce variation in the time intervals $\Delta T1$, $\Delta T2$, $\Delta T3$, ... of the targets 27. Even when the time intervals $\Delta T1$, $\Delta T2$, $\Delta T3$, ... of the targets 27 vary slightly, the pulse energy of the pulse laser light 33 can be stabilized by controlling the optical modulator OM.

(12) According to the first embodiment, the laser system 3 includes the YAG laser device.

By irradiating the target 27 with the pulse laser light 33 generated using the YAG laser device, EUV light can be efficiently generated. Even when the pulse energy of the pulse laser light 31 varies, the pulse energy of the pulse laser light 33 can be stabilized by controlling the optical modulator OM.

(13) According to the first embodiment, the laser system 3 includes the excitation light source which outputs continuous oscillation laser light to excite the laser medium of the laser system 3.

Accordingly, the pulse energy of the pulse laser light 33 can be stabilized by controlling the optical modulator OM using the relationship between the laser oscillation interval $\Delta Tn$ and the pulse energy of the pulse laser light 31.

(14) According to the first embodiment, the optical modulator OM includes any one of an acoustic optical element, an electric optical element, and an attenuator.

Accordingly, the transmittance of the pulse laser light 31 through the optical modulator OM can be controlled with high response.

(15) According to the first embodiment, the EUV light generation system 11b further includes the EUV energy sensor 7a which detects the pulse energy of the EUV light generated by irradiating the target 27 with the pulse laser light 33. The processor 5 controls the transmittance of the pulse laser light 31 through the optical modulator OM based on both of the arrival timing at which the target 27 has reached the detection region 35 and the pulse energy of the EUV light.

Accordingly, it is possible to stabilize the pulse energy of the EUV light by performing control using the measurement value of the pulse energy of the EUV light in addition to suppressing variation in the pulse energy of the pulse laser light 33 according to variation in the time intervals $\Delta T1$, $\Delta T2$, $\Delta T3$, ... of the targets 27.

(16) According to the first embodiment, the processor 5 performs feedback control on the transmittance of the pulse laser light 31 through the optical modulator OM based on the pulse energy of the EUV light.

Accordingly, it is possible to stabilize the pulse energy of the EUV light with the feedback control using the measurement value of the pulse energy of the EUV light. In other respects, the first embodiment is similar to the comparative example.

4. EUV Light Generation System 11c Including Prepulse Laser Device 3P

4.1 Configuration

Figure 11:
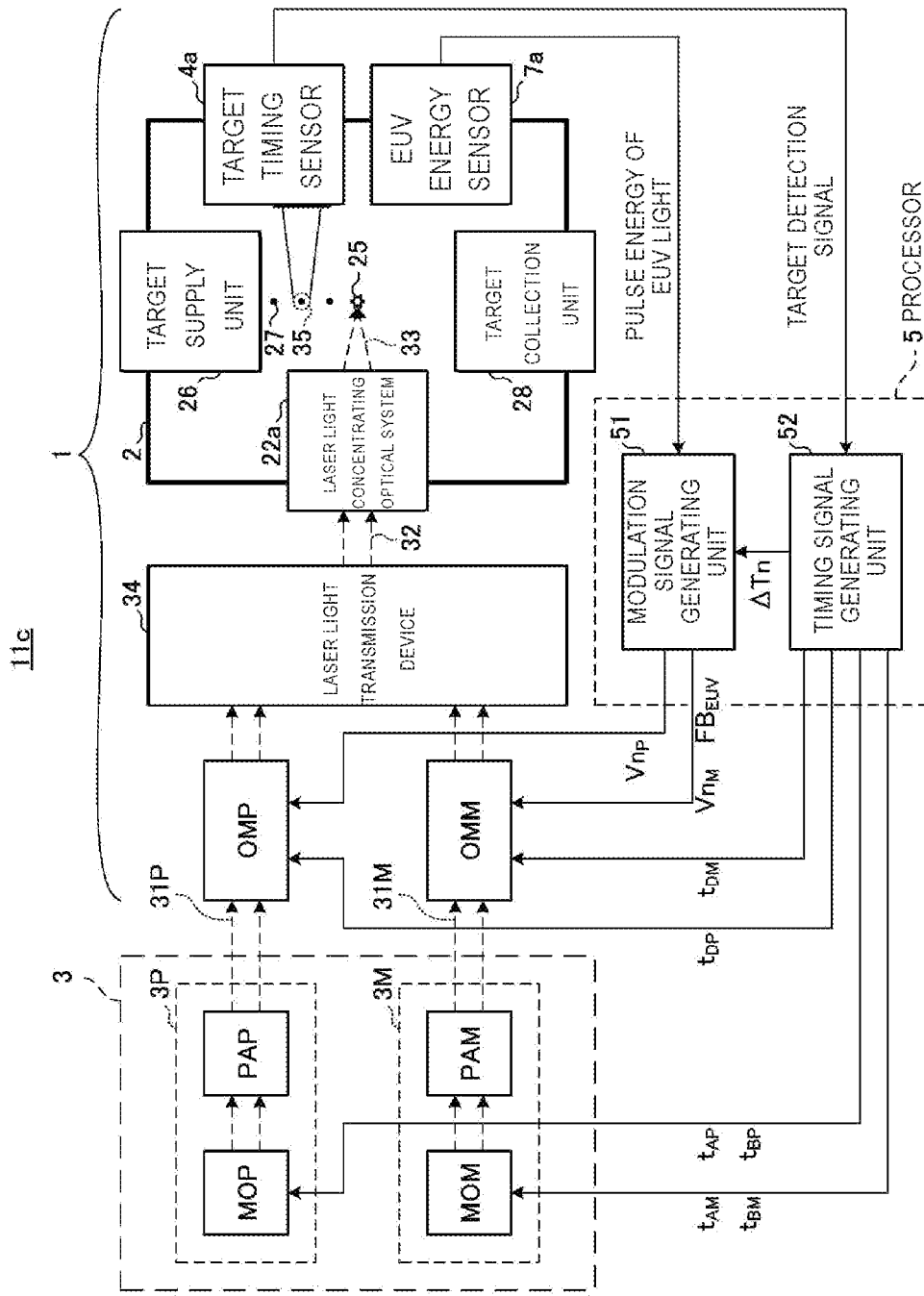
FIG. 11 schematically shows the configuration of an EUV light generation system according to a second embodiment.

FIG. 11 schematically shows the configuration of an EUV light generation system 11c according to a second embodiment. In the second embodiment, the laser system 3 includes a prepulse laser device 3P and a main pulse laser device 3M. The prepulse laser device 3P includes a master oscillator MOP and an amplifier PAP, and the main pulse laser device 3M includes a master oscillator MOM and an amplifier PAM.

A first optical modulator OMP is arranged on an optical path of prepulse laser light 31P between the prepulse laser device 3P and the laser light transmission device 34. The first optical modulator OMP corresponds to the first optical adjuster in the present disclosure.

A second optical modulator OMM is arranged on an optical path of main pulse laser light 31M between the main pulse laser device 3M and the laser light transmission device 34. The second optical modulator OMM corresponds to the second optical adjuster in the present disclosure.

4.2 Operation

The master oscillators MOP, MOM perform laser oscillation and output pulse laser light, respectively. The output timing of the pulse laser light by the master oscillator MOP is controlled by a first trigger timing signal. The output timing of the pulse laser light by the master oscillator MOM is controlled by a second trigger timing signal.

Each of the first trigger timing signal and the second trigger timing signal is similar to the trigger timing signal in the comparative example. However, the delay time $t_{AP}$ of the first trigger included in the first trigger timing signal is shorter than the delay time $t_{AM}$ of the first trigger included in the second trigger timing signal. As a result, the prepulse laser light 31P is generated earlier than the main pulse laser light 31M.

The first trigger timing signal may further include the second trigger having a delay time $t_{AP}+t_{BP}$ with respect to the rising of a pulse in the target detection signal. The second trigger timing signal may further include the second trigger having a delay time $t_{AM}+t_{BM}$ with respect to the rising of a pulse in the target detection signal.

The first optical modulator OMP transmits the prepulse laser light 31P at transmittance corresponding to an application voltage $Vn_P$. The second optical modulator OMM transmits the main pulse laser light 31M at transmittance corresponding to an application voltage $Vn_M$.

A delay time $t_{DP}$ given to the first optical modulator OMP is longer than the delay time $t_{AP}$. The difference between the delay time $t_{CP}$ and the delay time $t_{AP}$ is shorter than the time required for the prepulse laser light 31P to reach the first optical modulator OMP after the master oscillator MOP starts laser oscillation.

A delay time $t_{DM}$ given to the second optical modulator OMM is longer than the delay time $t_{AM}$. The difference between the delay time $t_{DM}$ and the delay time $t_{AM}$ is shorter than the time required for the main pulse laser light 31M to reach the second optical modulator OMM after the master oscillator MOM starts laser oscillation.

The laser light transmission device 34 guides the prepulse laser light 31P and the main pulse laser light 31M incident from the first and second optical modulators OMP, OMM to the laser light concentrating optical system 22a. The prepulse laser light 31P and the main pulse laser light 31M are incident on the laser light concentrating optical system 22a as the pulse laser light 32.

The prepulse laser light 31P is radiated to the target 27 in a droplet form as the pulse laser light 33. The target 27 irradiated with the prepulse laser light 31P is broken and diffused by the energy of the prepulse laser light 31P. Variation in the pulse energy of the prepulse laser light 31P may affect the diffused state of the target 27. When the diffused state of the target 27 is an undesirable state, the pulse energy of the EUV light may not be a desirable value even when the target 27 is irradiated with the main pulse laser light 31M.

Therefore, it is desirable that the pulse energy of the prepulse laser light 31P is stable without depending on variation in the laser oscillation interval ΔTn. Further, in order to suppress variation in the diffused state of the target 27 due to variation in the pulse energy of the EUV light, the pulse energy of the prepulse laser light 31P may not be feedback-controlled based on the pulse energy of the EUV light.

Then, the modulation signal generating unit 51 controls the transmittance of the prepulse laser light 31P through the first optical modulator OMP using the application voltage $Vn_P$ calculated based on the laser oscillation interval ΔTn.

The target 27 diffused by being irradiated with the prepulse laser light 31P is irradiated with the main pulse laser light 31M as the pulse laser light 33. The target 27 irradiated with the prepulse laser light 31P and the main pulse laser light 31M is turned into plasma, and EUV light is radiated from the plasma. The pulse energy of the main pulse laser light 31M may affect the pulse energy of the EUV light. For example, when the pulse energy of the main pulse laser light 31M is low, the pulse energy of the EUV light may be low.

Therefore, it is preferable that the pulse energy of the main pulse laser light 31M is stable without depending on variation in the laser oscillation interval ΔTn. Further, in order to control the pulse energy of the EUV light into the vicinity of the target value, the pulse energy of the main pulse laser light 31M may be feedback-controlled based on the pulse energy of the EUV light.

Then, the modulation signal generating unit 51 controls the transmittance of the main pulse laser light 31M through the second optical modulator OMM using both of the application voltage $Vn_M$ calculated based on the laser oscillation interval ΔTn and the feedback control signal $FB_{EUV}$ based on the pulse energy of the EUV light received from the EUV energy sensor 7a.

That is, the modulation signal generating unit 51 controls the transmittance so that the pulse energy of the EUV light has a greater influence on the transmittance of the main pulse laser light 31M through the second optical modulator OMM than the transmittance of the prepulse laser light 31P through the first optical modulator OMP.

4.3 Effect

(17) According to the second embodiment, the EUV light generation system 11c includes the EUV energy sensor 7a which detects the pulse energy of the EUV light generated by irradiating the target 27 with the pulse laser light 33. The laser system 3 includes the prepulse laser device 3P which outputs the prepulse laser light 31P, and the main pulse laser device 3M which outputs the main pulse laser light 31M. The prepulse laser light 31P is radiated to the target 27, and the main pulse laser light 31M is radiated to the target 27 to which the prepulse laser light 31P has been radiated. The EUV light generation system 11c includes, as the optical adjuster, the first optical modulator OMP arranged on the optical path between the prepulse laser device 3P and the plasma generation region 25 and the second optical modulator OMM arranged on the optical path between the main pulse laser device 3M and the plasma generation region 25. The processor 5 controls the transmittance of the prepulse laser light 31P through the first optical modulator OMP based on the arrival timing at which the target 27 has reached the detection region 35. In addition, the processor 5 controls the transmittance of the main pulse laser light 31M through the second optical modulator OMM based on both of the arrival timing and the pulse energy of the EUV light.

Accordingly, since the main pulse laser light 31M is radiated to the target 27 having been irradiated with the prepulse laser light 31P and diffused, the target 27 can be efficiently turned into plasma. Further, even when the time intervals ΔT1, ΔT2, ΔT3, . . . of the targets 27 vary, variation in the pulse energy of the prepulse laser light 31P radiated to the target 27 can be suppressed, so that the diffused state of the target 27 can be stabilized. Further, since the pulse energy of the main pulse laser light 31M radiated to the target 27 is controlled based on both of the time intervals ΔT1, ΔT2, ΔT3, . . . of the targets 27 and the pulse energy of the EUV light, the pulse energy of the EUV light can be stabilized.

(18) According to the second embodiment, the processor 5 controls the transmittance so that the pulse energy of the EUV light has a greater influence on the transmittance of the main pulse laser light 31M through the second optical modulator OMM than the transmittance of the prepulse laser light 31P through the first optical modulator OMP.

Accordingly, since influence of the pulse energy of the EUV light on the transmittance of prepulse laser light 31P through the first optical modulator OMP can be reduced, it is possible to suppress variation in the diffused state of the target 27 due to variation in the pulse energy of the EUV light.

In other respects, the second embodiment is similar to the first embodiment.

5. Others

Figure 12:
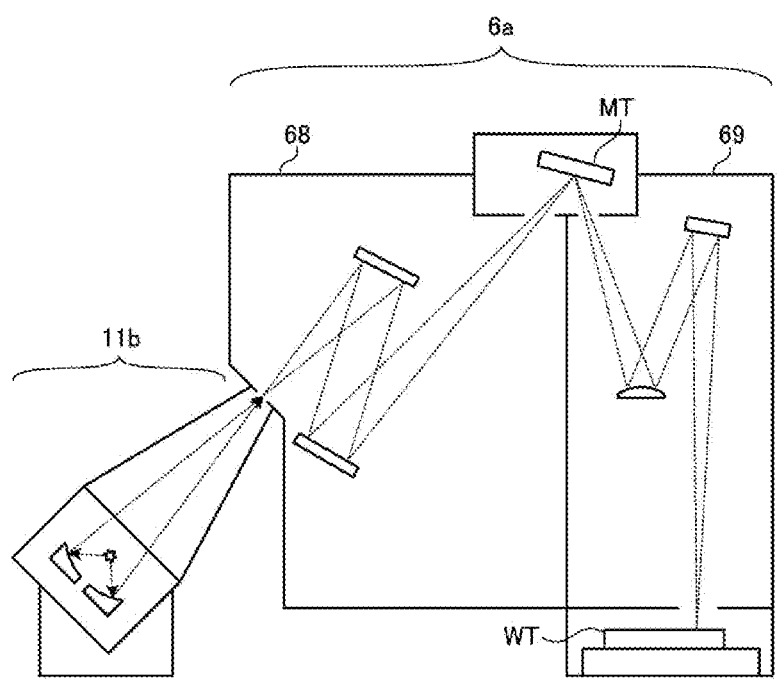
FIG. 12 schematically shows the configuration of an exposure apparatus connected to the EUV light generation system.

FIG. 12 schematically shows the configuration of an exposure apparatus 6a connected to the EUV light generation system 11b.

In FIG. 12, the exposure apparatus 6a as the EUV light utilization apparatus 6 (see FIG. 1) includes a mask irradiation unit 68 and a workpiece irradiation unit 69. The mask irradiation unit 68 illuminates, via a reflection optical system, a mask pattern of a mask table MT with the EUV light incident from the EUV light generation system 11b. The workpiece irradiation unit 69 images the EUV light reflected by the mask table MT onto a workpiece (not shown) arranged on a workpiece table WT via the reflection optical system. The workpiece is a photosensitive substrate such as a semiconductor wafer on which photoresist is applied. The exposure apparatus 6a synchronously translates the mask table MT and the workpiece table WT to expose the workpiece to the EUV light reflecting the mask pattern. Through the exposure process as described above, a device pattern is transferred onto the semiconductor wafer, thereby an electronic device can be manufactured.

Figure 13:
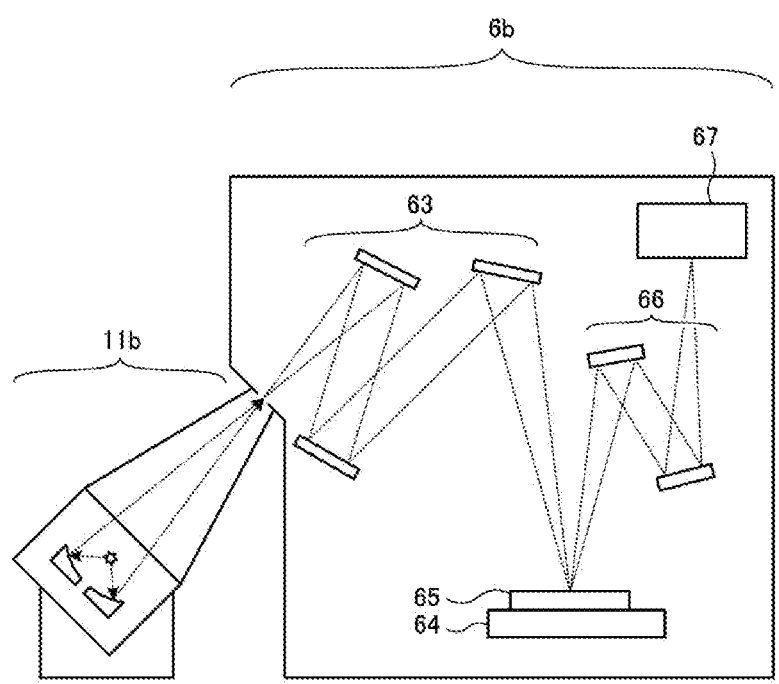
FIG. 13 schematically shows the configuration of an inspection apparatus connected to the EUV light generation system.

FIG. 13 schematically shows the configuration of an inspection apparatus 6b connected to the EUV light generation system 11b.

In FIG. 13, the inspection apparatus 6b as the EUV light utilization apparatus 6 (see FIG. 1) includes an illumination optical system 63 and a detection optical system 66. The Illumination optical system 63 reflects the EUV light incident from the EUV light generation system 11b to illuminate a mask 65 placed on a mask stage 64. Here, the mask 65 conceptually includes a mask blank before a pattern is formed. The detection optical system 66 reflects the EUV light from the illuminated mask 65 and forms an image on a light receiving surface of a detector 67. The detector 67 having received the EUV light obtains the image of the mask 65. The detector 67 is, for example, a time delay integration (TDI) camera. Defects of the mask 65 are inspected based on the image of the mask 65 obtained by the above-described process, and a mask suitable for manufacturing an electronic device is selected using the inspection result. Then, the electronic device can be manufactured by exposing and transferring the pattern formed on the selected mask onto the photosensitive substrate using the exposure apparatus 6a.

In FIG. 12 or FIG. 13, the EUV light generation system 11c may be used instead of the EUV light generation system 11b.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. An extreme ultraviolet light generation system, comprising:
   a target supply unit configured to supply a target substance to a first predetermined region;
   a laser system configured to output pulse laser light to be radiated to the target substance in the first predetermined region;
   a first sensor configured to detect an arrival timing at which the target substance has reached a second predetermined region between the target supply unit and the first predetermined region;
   an optical adjuster arranged on an optical path of the pulse laser light between the laser system and the first predetermined region; and
   a processor configured to control transmittance of the pulse laser light through the optical adjuster based on the arrival timing.

2. The extreme ultraviolet light generation system according to claim 1,
   wherein, when an interval of the arrival timing detected by the first sensor is a first time interval, the processor controls the transmittance so that the optical adjuster transmits the pulse laser light at first transmittance, and when the interval of the arrival timing detected by the first sensor is a second time interval shorter than the first time interval, the processor controls the transmittance so that the optical adjuster transmits the pulse laser light at second transmittance higher than the first transmittance.

3. The extreme ultraviolet light generation system according to claim 1,
   wherein the processor controls the transmittance so that second variation in pulse energy of the pulse laser light transmitted through the optical adjuster is smaller than first variation in pulse energy of the pulse laser light incident on the optical adjuster.

4. The extreme ultraviolet light generation system according to claim 1,
   wherein the processor controls the transmittance by controlling an application voltage of the optical adjuster.

5. The extreme ultraviolet light generation system according to claim 1,
   wherein the processor controls the transmittance based on the arrival timing within a period after the target substance reaches the second predetermined region until the target substance reaches the first predetermined region.

6. The extreme ultraviolet light generation system according to claim 1,
   wherein the processor outputs a trigger timing signal to the laser system based on the arrival timing.

7. The extreme ultraviolet light generation system according to claim 1,
   wherein the processor outputs different timing signals respectively to the laser system and the optical adjuster based on the arrival timing.

8. The extreme ultraviolet light generation system according to claim 1,
   wherein the processor controls the transmittance based on a relationship between a laser oscillation interval of the laser system and a pulse energy of the pulse laser light.

9. The extreme ultraviolet light generation system according to claim 1,
   wherein the processor controls the transmittance based on both of a relationship between a laser oscillation interval of the laser system and a pulse energy of the pulse laser light and a relationship between an application voltage of the optical adjuster and the transmittance.

10. The extreme ultraviolet light generation system according to claim 1,
    wherein the processor controls the transmittance based on both of a change rate of a pulse energy of the pulse laser light when a laser oscillation interval of the laser system varies and a change rate of the transmittance when an application voltage of the optical adjuster varies.

11. The extreme ultraviolet light generation system according to claim 1,
    wherein the target supply unit supplies the target substance in a droplet form to the first predetermined region.

12. The extreme ultraviolet light generation system according to claim 1,
wherein the laser system includes a YAG laser device.

13. The extreme ultraviolet light generation system according to claim 1,
wherein the laser system includes an excitation light source which outputs continuous oscillation laser light to excite a laser medium of the laser system.

14. The extreme ultraviolet light generation system according to claim 1,
wherein the optical adjuster includes any one of an acoustic optical element, an electric optical element, and an attenuator.

15. The extreme ultraviolet light generation system according to claim 1,
further comprising a second sensor configured to detect a pulse energy of extreme ultraviolet light generated by irradiating the target substance with the pulse laser light,
wherein the processor controls the transmittance based on both of the arrival timing and the pulse energy.

16. The extreme ultraviolet light generation system according to claim 15,
wherein the processor performs feedback control on the transmittance based on the pulse energy.

17. The extreme ultraviolet light generation system according to claim 1,
further comprising a second sensor configured to detect a pulse energy of extreme ultraviolet light generated by irradiating the target substance with the pulse laser light,
wherein the pulse laser light includes prepulse laser light radiated to the target substance and main pulse laser light radiated to the target substance to which the prepulse laser light has been radiated,
the laser system includes a prepulse laser device which outputs the prepulse laser light and a main pulse laser device which outputs the main pulse laser light,
the optical adjuster includes a first optical adjuster arranged on an optical path of the prepulse laser light between the prepulse laser device and the first predetermined region, and a second optical adjuster arranged on an optical path of the main pulse laser light between the main pulse laser device and the first predetermined region, and
the processor controls transmittance of the prepulse laser light through the first optical adjuster based on the arrival timing and controls transmittance of the main pulse laser light through the second optical adjuster based on both of the arrival timing and the pulse energy.

18. The extreme ultraviolet light generation system according to claim 17,
wherein the processor controls the transmittance of the main pulse laser light so that the pulse energy has a greater influence on the transmittance of the main pulse laser light than the transmittance of the prepulse laser light.

19. An electronic device manufacturing method, comprising:
generating extreme ultraviolet light in an extreme ultraviolet light generation system;
emitting the extreme ultraviolet light to an exposure apparatus; and
exposing a photosensitive substrate to the extreme ultraviolet light in the exposure apparatus to manufacture an electronic device,
the extreme ultraviolet light generation system including:
a target supply unit configured to supply a target substance to a first predetermined region;
a laser system configured to output pulse laser light to be radiated to the target substance in the first predetermined region;
a first sensor configured to detect an arrival timing at which the target substance has reached a second predetermined region between the target supply unit and the first predetermined region;
an optical adjuster arranged on an optical path of the pulse laser light between the laser system and the first predetermined region; and
a processor configured to control transmittance of the pulse laser light through the optical adjuster based on the arrival timing.

20. An electronic device manufacturing method, comprising:
inspecting a defect of a mask by irradiating the mask with extreme ultraviolet light generated in an extreme ultraviolet light generation system;
selecting a mask using a result of the inspection; and
exposing and transferring a pattern formed on the selected mask onto a photosensitive substrate,
the extreme ultraviolet light generation system including:
a target supply unit configured to supply a target substance to a first predetermined region;
a laser system configured to output pulse laser light to be radiated to the target substance in the first predetermined region;
a first sensor configured to detect an arrival timing at which the target substance has reached a second predetermined region between the target supply unit and the first predetermined region;
an optical adjuster arranged on an optical path of the pulse laser light between the laser system and the first predetermined region; and
a processor configured to control transmittance of the pulse laser light through the optical adjuster based on the arrival timing.

* * * * *